J. T. JONES.
MINER'S LAMP.
APPLICATION FILED JULY 18, 1916.

1,218,185.

Patented Mar. 6, 1917.
2 SHEETS—SHEET 1.

WITNESSES
Roland T. Williams
N. N. Babcock

INVENTOR
John T. Jones
BY Richard Bowen
ATTORNEY

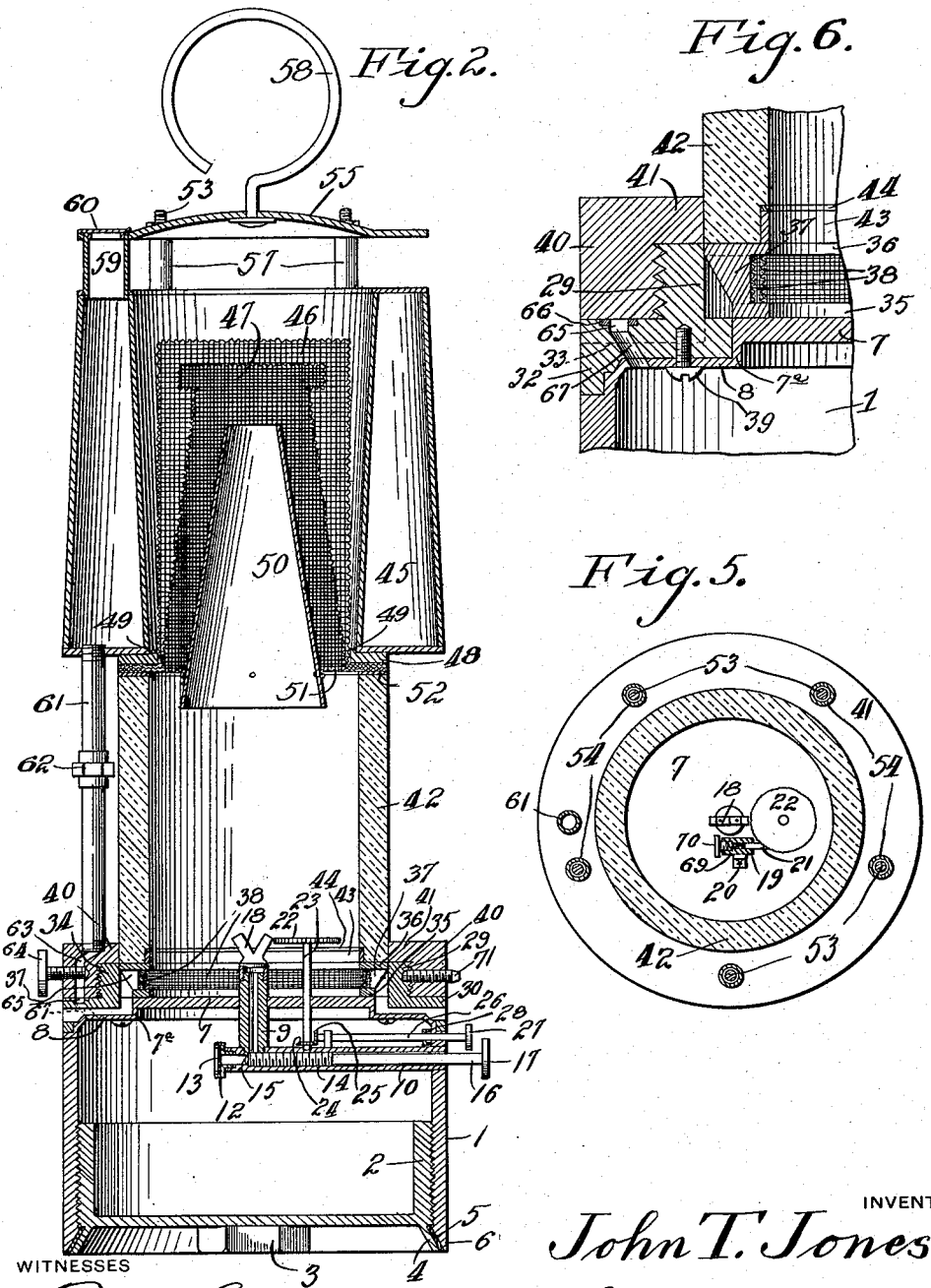

UNITED STATES PATENT OFFICE.

JOHN T. JONES, OF ERNEST, PENNSYLVANIA.

MINER'S LAMP.

1,218,185. Specification of Letters Patent. Patented Mar. 6, 1917.

Application filed July 18, 1916. Serial No. 109,916.

*To all whom it may concern:*

Be it known that I, JOHN T. JONES, a citizen of the United States, residing at Ernest, in the county of Indiana and State of Pennsylvania, have invented certain new and useful Improvements in Miners' Lamps, of which the following is a specification.

This invention relates to miners' lamps and more particularly to a carbid lamp for use in mines and similar places and so constructed as to give a maximum of light for a given quantity of gas consumed.

One of the main objects of the invention is to provide a lamp of the character stated of simple construction and operation which is provided with igniting means contained in the combustion chamber of the lamp.

A further object is to provide a lamp having means for protecting the safety gauze cylinders from being endangered by sudden flare-ups of the flame due to a too rapid generation of gas in the carbid chamber.

A still further object is to provide a lamp which can be quickly and easily assembled and disassembled as required.

Further objects will appear from the detailed description.

In the drawings:

Fig. 2 is a vertical central sectional view through the lamp.

Fig. 5 is a section on the line 5—5 of Fig. 1, and

Fig. 6 is a detail fragmentary sectional view.

Figure 1:
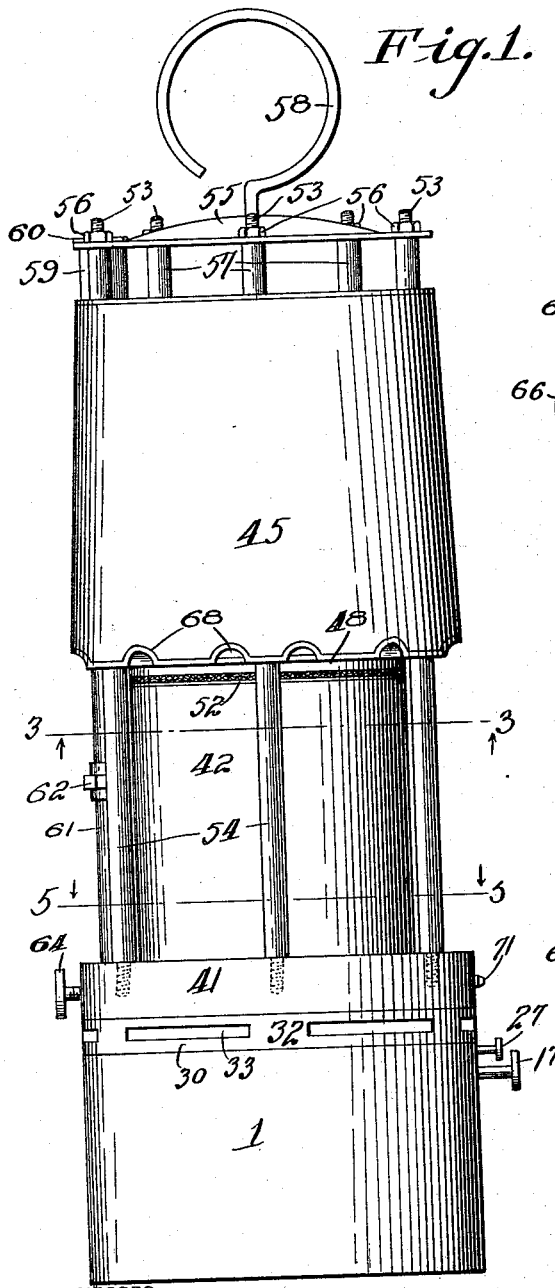
Figure 1 is a side view of the invention.
Figure 4:
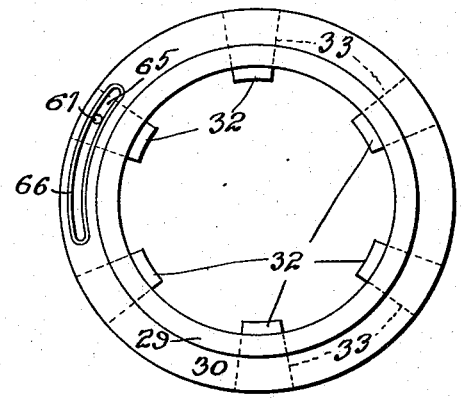
Fig. 4 is a plan view of the draft ring.
Figure 3:
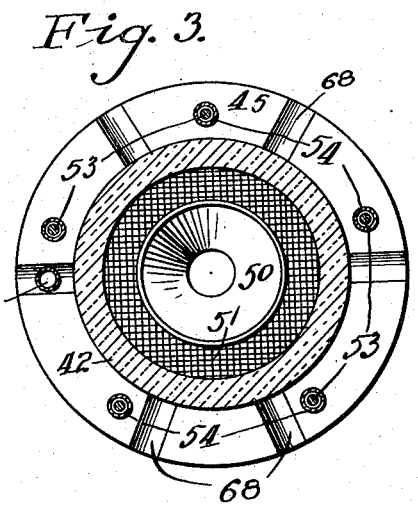
Fig. 3 is a section on line 3—3 of Fig. 1.

The base of the lamp is hollow to form a cylindrical carbid tank 1. The lower portion of the base is internally threaded to receive an externally threaded hollow plug 2 provided with an integral centrally located hexagonal nut 3. By this means the plug can be easily threaded into or removed from the base. The plug is further provided at its lower end with an outwardly flaring flange 4. This flange engages a packing ring or gasket 5 mounted between the same and the downwardly and outwardly beveled edges 6 at the lower end of the tank 1. This provides a gas tight closure between the plug and tank.

The upper end of said tank 1 is closed by an integral disk portion 7 connected to the body of the tank, a neck 7ª, and a horizontal shoulder 8. The disk 7 is provided at its center with an aperture through which is secured a burner tube 9. The lower end of this tube is reduced and threaded into an aperture near the inner end of a horizontal tube which is secured in the wall of tank 1. The tube 10 is internally threaded at its inner end to receive the threaded neck of a thimble ring 12, which carries a gauze screen 13 positioned over the inlet end of the tube. The tube 10 is also internally threaded in its intermediate portion to receive the threaded shank 14 of a needle valve 15, the inner end of which extends slightly beyond the central passage through the tube 9 when the valve is in its innermost position. This valve is provided with a stem 16 which projects beyond the side of tank 1 and is provided with a small hand wheel 17 on its outer end. By this means the flow of gas from the tank 1 into the burner tube 9 may be controlled as desired, or may be entirely stopped.

A suitable two arm burner 18 is secured on the upper end of burner tube 9. A small sleeve 19 of any suitable refractory material is supported by a standard 20 secured to the disk 7 adjacent the burner 18. A pencil or stick 21 of pyrophoric alloy or other suitable material, is mounted in the sleeve 19 and projects from the same, so as to be in engagement with the serrated edge of a disk 22. This disk is secured on the upper end of a vertical shaft 23 passing through the top disk 7 of the tank 1, the lower end of which is rotatably seated in a recess in the top of tube 10. A beveled pinion 24 is secured on the shaft 23 near the lower end thereof. This pinion is in mesh with a second beveled pinion 25 secured on the inner end of a rod 26 mounted above and parallel with the tube 10. This rod is provided on its outer end with a small hand-wheel 27. By opening the valve 14 so as to permit gas to flow through the burner 18 and then rotating the disk 22 by means of the rod 26 and beveled gears 24 and 25, so as to cause the stick 21 to give off a number of sparks, the lamp may be quickly and easily ignited.

The outer end of tube 10 may be secured to the wall of tank 1 by being shrunk into the same, or by any other suitable means so as to form a gas tight closure. The rod 26 is provided with a suitable packing gland 28 near its outer end where it passes through the wall of the tank so as to form a gas tight closure.

On the annular shoulder 8 at the top of tank 1, I mount a draft ring 29. This ring is provided with a horizontal flange 30, which fits snugly about the shoulder 8 of the tank 1. The draft ring is further provided with a plurality of equally spaced radially disposed blocks or web members 32. These members provide a series of inwardly converging air passages 33. The blocks 32 extend inward a slight distance beyond the inner face of the externally threaded vertical flange 34 of the ring. This provides an annular air chamber between the neck of the tank 1 and the flange 34. This chamber is concentric with the combustion chamber of the lamp and insures a proper supply of air to the same.

On the upper end of the tank 1, I mount a ring 35. This ring is spaced from, and integrally connected to, an upper ring 36, by radially disposed spacing blocks 37 formed integrally with the two rings. Between these rings are supported two concentric rings 38 of fine wire gauze. This gauze may be secured to the inner faces of the spacing blocks 37, suitable spacing members being inserted between the gauze rings, or may be secured in position in any other suitable manner. As will be clear from Figs. 2 and 6 of the drawings, the gauze rings 38 and the air passages 33 of ring 29 permit a relatively large quantity of air to flow into the combustion chamber, and the gauze rings act in the usual manner to prevent explosion of the mine gases by becoming ignited from the lamp.

The ring 29 is secured to the tank 1 by means of screws 39 passed through the same and threaded into suitable bores in the blocks 32. By this means the tank and ring are secured together so as to form a practically integral structure, and the ring may be detached from the lamp when necessary. A vertical externally threaded flange 34 of the ring 29 is threaded into an internally threaded ring 40. This ring 40 is provided with an inwardly projecting annular flange 41 which fits snugly about the lower end portion of a transparent cylinder 42. The lower end of this cylinder rests on the upper ring 36 of the gauze support and is provided with an inner annular recess which receives a narrow metal ring 43 which also rests on the ring 36. A packing ring 44 is mounted on the upper edge of the ring 43 and acts to form an air tight closure between the cylinder and the ring. By this construction the rings 40, 36, and 44, and the cylinder 42, coact to form a gas tight closure at the lower end of the cylinder.

Above the cylinder 42, and concentric therewith, I mount a sheet metal water tank 45. This tank is approximately U-shape and incloses a central cylindrical chamber which flares slightly upward and outward. In the chamber inclosed by the tank, I mount an outer gauze cylinder 46 and an inner cylinder 47. These two cylinders have their lower edges turned outward to form annular flanges which are mounted beneath a metallic ring 48 mounted beneath the tank 45. This ring has an annular upwardly projecting bead 49 which fits snugly within the lower end of the tank so as to make a tight closure therewith. Inside of the inner gauze cylinder 47 and concentric therewith I suspend a sheet metal chimney 50. This chimney is of conical shape and is provided with a gauze disk 51 riveted thereto and projecting beneath the metal ring 48. Between the outer edge of the disk 51 and the upper edge of the cylinder 42, I mount an asbestos packing ring 52. By forcing the water tank 45 downwardly and the base of the lamp upwardly, I effect a gas tight closure about the upper end of the cylinder 42 and also secure the various parts of the lamp together.

For the purpose of securing the base of the lamp and the water tank together, I pass a number of suitably spaced rods 53 through the water tank and thread the ends of these rods into suitably threaded bores in the ring 41. A spacing sleeve 54 is mounted about each rod between the top of ring 41 and the bottom of tank 45. This sleeve serves to hold the tank and the ring in proper spaced relation. Above the tank 45, I mount a hood 55. The rods 53 pass through this hood and suitable nuts 56 are threaded on the ends thereof. Spacing sleeves 57 mounted above the rods, between the top of tank 45 and the hood 55 serve to hold the hood and tank in proper spaced relation. A finger-ring 58 is secured through the center of the hood and serves as a carrying medium for the lamp.

The hood 55 carries a short sleeve 59 which projects into the tank 45 through a suitable opening in the top of the tank. This sleeve is closed by means of a cover 60. By raising this cover 60 the tank may be quickly and easily filled. A water supply pipe 61 is connected to the bottom of tank 45. This pipe is formed of two sections connected by a union-coupling 62. By unscrewing the union 62 and removing the nuts 56 from the rods 53, the lamp may be quickly and easily disassembled. The water flows from the tank 45 through the pipe 61 into a port 63 provided through the ring 41. This port is controlled by a regulating screw 64 threaded into the ring and projecting through the same. The lower end of port 63 communicates with a shallow groove or gutter 65 of arcuate shape formed in the upper face of the ring 29. A rubber gasket 66 is set in a recess concentric with the gutter 65, so as to form a liquid tight closure about the same between the upper face of the ring 29 and the lower face of ring 41. The ring 29 is further provided with a port 67 communicating with the gutter 65, and this port passes through one of the blocks 32 and is in register with a port through the horizontal annular shoulder 8 of the tank 1. It will be evident that by this construction, if the port 63 is at any point over the gutter 65, and the regulating screw 64 is operated to open the port, the water will flow from the tank 45 into the tank 1. If there were no wearing of the packing rings and the various elements of the lamp, it would not be necessary to provide the gutter 65, as the port 63 could at all times be brought into registry with the port 67. However, in order to accommodate the wear of the packing elements and other parts of the lamp, the gutter 65 is provided.

As an additional means of preventing ignition of the mine gases from the lamp, I provide the tank 45, at its lower end, with a series of radially disposed corrugations or openings 68. By this means a current of air is created which flows from the bottom of the tank upward along the gauze cones 46 and 47. This materially lowers the temperature of these elements and effectually prevents their becoming heated to such an extent as to ignite the mine gases. As an additional protection to these gauze cylinders, the chimney 50 is provided. In the case of water being fed too quickly on to the carbid in the tank 1 the gas would be generated so quickly as to cause a sudden flareup of the blaze. If there were no chimney provided this blaze would cause injury to the gauze cylinders. The chimney 50 being positioned directly above burner 18, will receive any such flares and extinguish the blaze before any injury is caused to the cylinders 46 and 47. In connection with the openings 68 provided through the bottom of tank 45, it is to be noted that the inner ends of these openings are outside of the outer gauze cylinder 46. By this arrangement, all danger of ignition of the mine gases by the flame of the lamp is eliminated.

In order that the stick 21 of pyrophoric alloy may be held tightly against the periphery of the disk 22, I provide a small coil spring 69 in the sleeve 19. This sleeve is confined between the inner end of the stick 21 and an adjusting screw 70 threaded into the opposite end of sleeve 19. By turning this screw, the pressure on the stick may be either increased or diminished according to circumstances, so as to insure proper operation of the igniting device.

In using my lamp, after shutting off the water supply by means of the regulating screw 64, the hollow cylindrical plug 2 is removed. This plug contains all of the used carbid or sludge and may be quickly and easily emptied and washed out. After the plug has been cleaned, a suitable charge of carbid is placed in the same and it is then threaded into position in the bottom of tank 1. The supply of water to the tank may then be again established by means of the screw 64. As the water drops onto the carbid, it causes generation of the gas which passes through the gauze screen 13 and the burner tube 9 and burner 18, as previously described. If the lamp is burning and it is desired to renew the charge of carbid, the plug 2 may be removed and the lamp set upon a flat surface such as will make a comparatively tight closure about the lower end of tank 1. By this means the gas remaining in the tank will be confined therein, so as to flow to the burner and it will be possible to recharge the lamp without extinguishing it.

For the purpose of preventing tampering with the lamp I provide means for locking the base and the body together. For this purpose, I provide ring 40 with a threaded bore into which I thread a locking screw 71. The inner end of this screw is adapted to engage a series of recesses provided in the vertical flange 34 of ring 29. The outer end of the screw is provided with a tapered head of polygonal cross section adapted to be operated by a socket key. By this construction, which is more or less of a standard one, it is impossible for any one to obtain access to the interior of the lamp except the person who has the key for operating the screw 71.

It will be obvious that there can be changes made in the construction and disposition of the various parts of my invention, without departing from the field and scope of the same, and I intend to include all such variations as fall within the scope of the appended claims in this application in which a preferred form only of the invention is disclosed.

What I claim is:

1. In a lamp of the character described, the combination of a hollow cylindrical base, a burner carried thereby and communicating with the interior of said base, a water tank mounted above the burner and concentric therewith, a ring secured on the base and provided with a plurality of air passages, said ring being provided with an arcuate groove in its upper face, a ring threaded on to the first said ring and provided with a duct communicating with the said arcuate recess, the first said ring being also provided with a duct communicating with the arcuate recess, and the cylindrical base also having an aperture in register with the said duct, a water tank mounted above the burner, a water tube communicating therewith and with the duct of the ring threaded on the first mentioned ring, means for controlling the flow of water through said duct, the said water tube being composed of two separable sections, a cylinder intermediate the water tank and the base, a gauze cylinder inclosed by the tank and secured between the same and the cylinder, a gauze cylinder mounted inside of the ring secured to the base and interposed between the air inlets and the burner, and means for detachably securing the tank and the base together and forcing them toward each other.

2. In a lamp of the character described, the combination of a hollow cylindrical base, a burner carried by said base, a water tank mounted above the burner and concentric therewith, a cylinder intermediate the tank and the base, a draft ring secured on the base and provided with a plurality of air inlets, a gauze ring interposed between the air inlets of said ring and the burner, a gauze cylinder inclosed by the tank and secured between the same and the upper end of the cylinder, the said tank being provided with a plurality of openings near its lower end, a chimney mounted above the burner, a gauze disk secured to the chimney and between the upper end of the shade and the tank, a conduit communicating with said tank and base and means for securing the tank and base together and forcing them toward each other.

In testimony whereof I affix my signature in presence of two witnesses.

JOHN T. JONES.

Witnesses:
MARTIN J. GILBERT,
WILLIAM JONES.

Copies of this patent may be obtained for five cents each, by addressing the "Commissioner of Patents, Washington, D. C."